No. 769,693. PATENTED SEPT. 13, 1904.
T. C. FORBES.
DEVICE FOR STEADYING SHIPS.
APPLICATION FILED JAN. 8, 1903.
NO MODEL. 3 SHEETS—SHEET 1.

Witnesses.
A. H. Opsahl.
H. D. Kilgore

Inventor.
Thomas C. Forbes.
By his Attorneys
Williamson & Merchant

No. 769,693. PATENTED SEPT. 13, 1904.
T. C. FORBES.
DEVICE FOR STEADYING SHIPS.
APPLICATION FILED JAN. 8, 1903.
NO MODEL. 3 SHEETS—SHEET 2.

Witnesses.
A. H. Opsahl.
H. D. Kilgore

Inventor.
Thomas. C. Forbes.
By his Attorneys
Williamson & Merchant

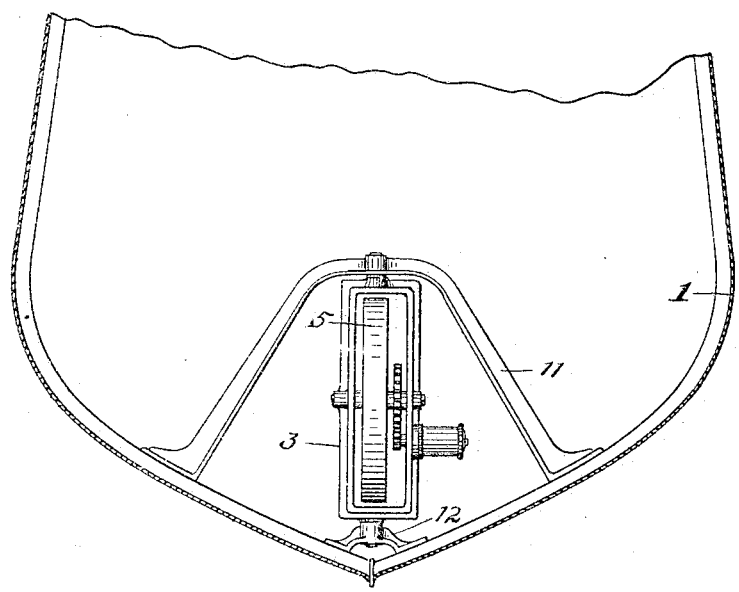

No. 769,693.

Patented September 13, 1904.

UNITED STATES PATENT OFFICE.

THOMAS C. FORBES, OF MINNEAPOLIS, MINNESOTA.

DEVICE FOR STEADYING SHIPS.

SPECIFICATION forming part of Letters Patent No. 769,693, dated September 13, 1904.

Application filed January 8, 1903. Serial No. 138,185. (No model.) REISSUED

*To all whom it may concern:*

Be it known that I, THOMAS C. FORBES, a citizen of the United States, residing at Minneapolis, in the county of Hennepin and State of Minnesota, have invented certain new and useful Improvements in Devices for Steadying Ships; and I do hereby declare the following to be a full, clear, and exact description of the invention, such as will enable others skilled in the art to which it appertains to make and use the same.

My invention has for its object to provide improved means for preventing the lateral rocking or rolling of ships or vessels; and to this end it consists of the novel devices and combinations of devices hereinafter described, and defined in the claims.

It is a well-known fact that a wheel, disk, or other rotary body, for convenience herein broadly designated as a "fly-wheel," when set under high rotary motion in a certain plane will tend to maintain its rotation in that plane and will exert a force resisting any movement from said plane which is dependent upon its weight and its peripheral speed, or, in other words, upon the centrifugal force which it exerts under such rotation. Such a wheel when mounted in an oscillating frame or support constitutes what is known as a "gyroscope."

In my present invention I utilize the force of a gyroscope to prevent the swinging or rolling movements of a vessel or ship. In applying the gyroscope to the vessel or ship the oscillating fly-wheel support is mounted on an axis that extends transversely of the longitudinal axis of the vessel, and the flywheel is journaled in said oscillating frame or support on an axis that transversely intersects the axis of its said oscillating support.

My invention in its preferred form is illustrated in the accompanying drawings, wherein like characters indicate like parts throughout the several views.

Figure 1:
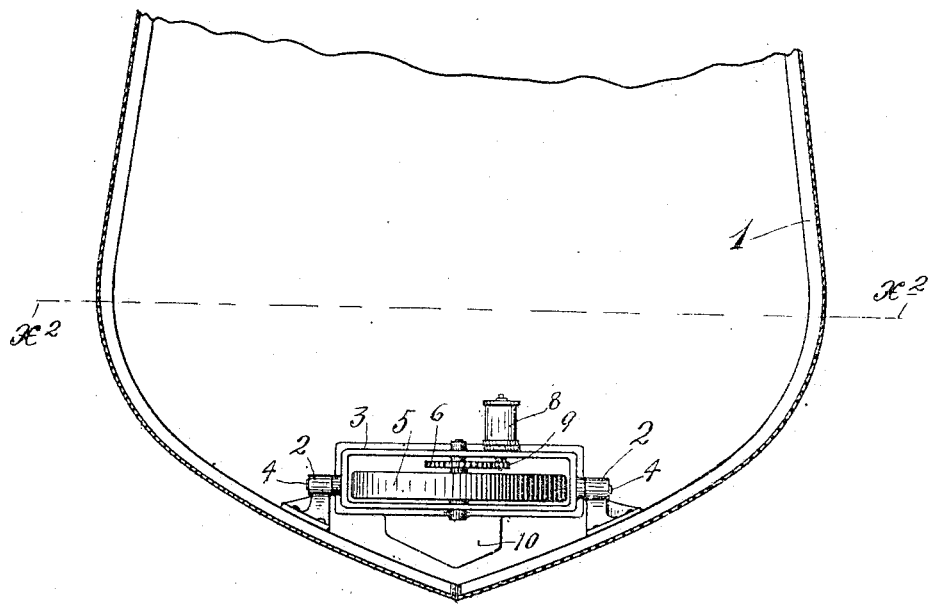
Figure 2:
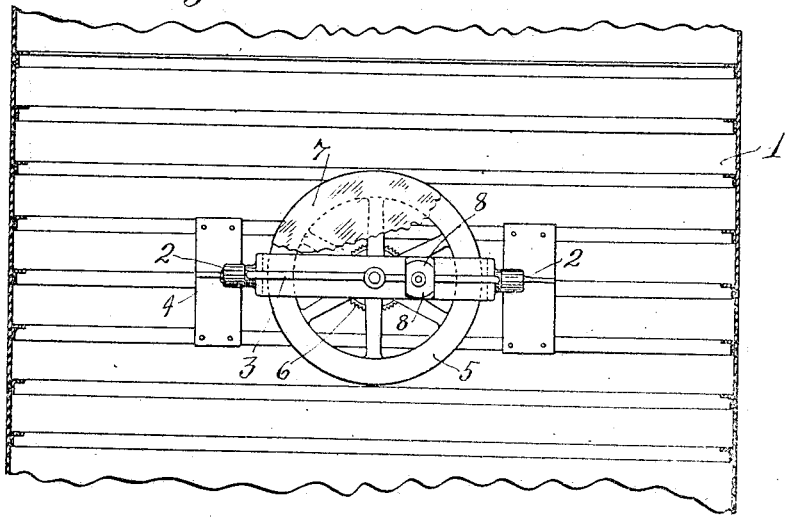
Figure 3:
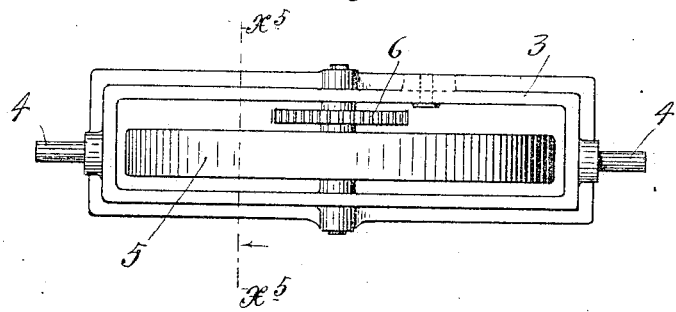
Figure 4:
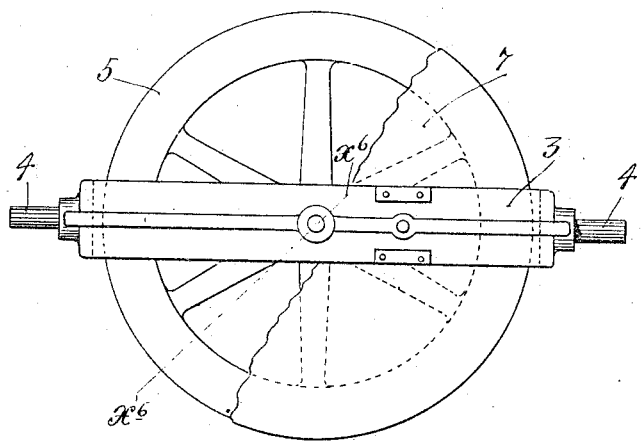
Figure 6:
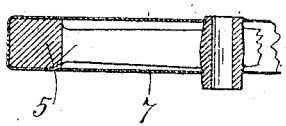
Figure 5:
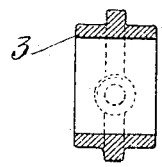

Figure 1 is a transverse vertical section of the body of a vessel, some parts thereof being broken away and showing my improved steadying device applied in working position thereto. Fig. 2 is a horizontal section approximately on the line $x^2 x^2$ of Fig. 1, some parts being broken away. Fig. 3 is a view corresponding, in the direction in which it is viewed, to Fig. 1, but showing the improved steadying device removed from working position. Fig. 4 is a plan view of the parts shown in Fig. 3, but with some parts broken away. Fig. 5 is a transverse section through the oscillating wheel-supporting bracket, taken on the line $x^5 x^5$ of Fig. 3. Fig. 6 is a section through the fly-wheel on the line $x^6 x^6$ of Fig. 4, some parts being broken away; and Fig. 7 is a view corresponding to Fig. 1, but illustrating a modified arrangement of the device.

The numeral 1 indicates the hull of a vessel, in the lower portion of which are rigidly secured in any suitable way a pair of laterally-spaced bearings 2.

The numeral 3 indicates a rectangular supporting-bracket which extends transversely of the body or hull of the vessel and is provided with trunnions 4, which are loosely pivoted in the bearings 2. Loosely journaled on the bracket 3 is a fly-wheel 5, which, as shown, is formed in spokes and on the hub of which, below the upper portion of the bracket 3, is secured a spur-gear 6. The fly-wheel 5 is covered with a thin and very smooth casing 7, preferably of sheet metal, so as to reduce to a minimum the friction on the fly-wheel in passing through the air under its rotation. The fly-wheel is conveniently driven from an electric motor 8, which is rigidly secured on the oscillating bracket 3 and the armature-shaft of which carries a pinion 9, running in mesh with the gear 6. The motor 8 will therefore of course move with the bracket 3 and always maintain a proper driving position with respect to the gear 6 and the flywheel 5. To give the fly-wheel a tendency to stand in a horizontal position with respect to the longitudinal direction of the vessel, a weight 10 is applied to the under portion of the oscillating bracket 3.

As near as I have been able to determine by experiments the action of my improved steadying device, applied as illustrated in the drawings, is substantially as follows: With the balancing device applied as illustrated in the drawings and when the fly-wheel is set under high rotary motion the force of the fly-wheel will resist the lateral rocking movements of the vessel, but will not resist the endwise pitching of the vessel. If the bracket 3 or other support for the fly-wheel were to be rigidly secured to the hull of the vessel, the force of the fly-wheel would tend to prevent lateral rocking motions of the vessel and also longitudinal pitching movements thereof; but since the longitudinal pitching movements of the vessel could not possibly be overcome, due to the great force, the greater part of the power of the fly-wheel would be wasted or dissipated in futile attempts to overcome such pitching movement. However, with the fly-wheel mounted on an oscillating support and with this oscillating support pivoted to swing on an axis which extends transversely of the hull of the vessel the entire centrifugal force of the fly-wheel will be exerted to resist lateral oscillations or rolling movements of the vessel.

By experiments with the above device applied to a row-boat I have found that even when the waves are running high the rocking motions of the boat may be either entirely overcome or reduced to such an extent that they are practically imperceptible.

In practice ball-bearings would advisably be applied to support the fly-wheel from its supporting-bracket and to support the latter from its supporting-bearings. In Fig. 7 the fly-wheel 5 is set to revolve in a vertical plane extending longitudinally of the vessel, and the frame 3 is journaled or pivoted in an upper bearing-yoke 11 and a lower bearing 12, which parts are rigidly secured to the hull 1 of the vessel. The fly-wheel may be set to revolve on an axis extending horizontally but transversely of the longitudinal axis of the vessel, providing the pivotal axis of the support be extended vertically. This would amount to turning the entire device (shown in the drawings) ninety degrees in a plane extending transversely of the vessel. This arrangement would be clearly within the scope of my invention, although the fly-wheel when thus set to revolve in a vertical plane extending longitudinally of the vessel would take up considerably more valuable space than when set to revolve in a horizontal space. In all cases, however, the pivotal axis of the oscillating support must extend transversely of the vessel, and the axis of the fly-wheel must extend transversely of the axis of said support and of the longitudinal axis of the vessel. To set the fly-wheel to revolve on an axis extending longitudinally of the axis of the vessel would destroy its utility for the purposes had in view—to wit, for preventing or resisting the lateral oscillations of the vessel.

What I claim, and desire to secure by Letters Patent of the United States, is as follows:

1. The combination with a vessel, of a fly-wheel support mounted to oscillate on an axis extending transversely of the axis of the vessel, a fly-wheel journaled in said oscillating support with its axis extending transversely of the axis of said support and of the longitudinal axis of the vessel, whereby the said fly-wheel is set to rotate in a plane extending in the general direction of the longitudinal axis of the vessel, and means for rotating said fly-wheel, substantially as described.

2. The combination with a vessel, of a fly-wheel support mounted to oscillate on an axis, a fly-wheel journaled in said support with its axis extending transversely of the axis of the said support, the axis of said support lying generally in the plane of motion to be counteracted, and means for rotating the said fly-wheel, substantially as described.

3. The combination with a vessel, of a fly-wheel support mounted to oscillate on an axis, a fly-wheel journaled in said support with its axis extending transversely of the axis of the said support, the axis of said support lying generally in the plane of motion to be counteracted, means to rotate the fly-wheel, and means to limit the angular movement of the support, substantially as described.

4. The combination with a vessel, of a body rotating freely and independently of the propelling mechanism of said vessel, a mounting for said body journaled to oscillate at right angles to the line of motion to be counteracted and means to maintain the body in rotation at a speed sufficient to generate a couple tending to neutralize the deviation of the vessel from its normal position, substantially as described.

5. The combination with a vessel, of a fly-wheel support mounted to oscillate on an axis, a fly-wheel journaled in said support with its axis extending transversely of the axis of said support, the axis of said support lying generally in the plane of motion to be counteracted, means to rotate the fly-wheel and means to limit the angular movement of the support, substantially as described.

6. The combination with a vessel, of a fly-wheel support mounted to oscillate on an axis, a fly-wheel journaled in said support with its axis extending transversely of the axis of the support, the axis of said support lying generally in the plane of motion to be counteracted, means to rotate the fly-wheel, and means tending to hold the fly-wheel in a horizontal position with respect to the longitudinal direction of the vessel.

In testimony whereof I affix my signature in presence of two witnesses.

THOMAS C. FORBES.

Witnesses:
ELIZABETH H. KELIHER,
F. D. MERCHANT.